(12) United States Patent
Simofi-Ilyes et al.

(10) Patent No.: US 7,508,146 B2
(45) Date of Patent: Mar. 24, 2009

(54) MULTI-SPEED DUAL FAN MODULE SYSTEM FOR ENGINE COOLING APPLICATIONS

(75) Inventors: Attila Simofi-Ilyes, London (CA); Andrew Lakerdas, London (CA); Mike Toner, Appin (CA); Alex Gubbels, Mt. Brydges (CA); Jahan Kargar, Windsor (CA)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 707 days.

(21) Appl. No.: 11/123,572

(22) Filed: May 6, 2005

(65) Prior Publication Data

US 2006/0099082 A1    May 11, 2006

Related U.S. Application Data

(60) Provisional application No. 60/619,750, filed on Oct. 18, 2004.

(51) Int. Cl.
  *H02P 5/00* (2006.01)
  *H02P 5/46* (2006.01)
  *H02P 7/08* (2006.01)
(52) U.S. Cl. .................. 318/66; 318/67; 318/568.18
(58) Field of Classification Search .............. 318/66, 318/67, 568.18
  See application file for complete search history.

(56) References Cited

U.S. PATENT DOCUMENTS 4,988,930 A * 1/1991 Oberheide ............... 318/82
6,545,438 B1 * 4/2003 Mays, II ............... 318/400.01

* cited by examiner

*Primary Examiner*—Walter Benson
*Assistant Examiner*—Erick Glass
(74) *Attorney, Agent, or Firm*—Manelli Denison & Selter PLLC; Edward J. Stemberger (57) ABSTRACT

A dual fan module system 28 includes a two-speed electric motor 12 for operating a first fan 36, a one-speed electric motor 14 for operating a second fan 38, and switching structure K1, K2, K3, and K4 constructed and arranged to operate the system at more than two different speeds.

17 Claims, 11 Drawing Sheets

FIG. 1
PRIOR ART

FIG. 2
PRIOR ART (RELAYS MUST BE TOGGLED TOGETHER)

| SPEED (BOTH MOTOR) | HIGH SPEED RELAY 18 | LOW SPEED RELAY 16 |
|---|---|---|
| OFF | 0 | 0 |
| LOW | 0 | 1 |
| HIGH | 1 | 0 |

0-OPEN
1-CLOSED

|  |  | | SERIES CONNECTION | PARALLEL CONNECTION |
|---|---|---|---|---|
|  |  | | SPEED | |
|  |  | OFF | 1 | 2 |
| RELAYS | K1 | OFF | ON | ON |
|  | K2 | OFF | OFF | ON |
|  | K3 | 0 | a | b |

| | | SPEED | | | | |
|---|---|---|---|---|---|---|
| | | OFF | 1 | 2 | 3 | 4 |
| RELAYS | K1 | OFF | ON | OFF | ON | OFF |
| | K2 | OFF | OFF | ON | OFF | ON |
| | K3 | OFF | OFF | OFF | ON | ON |
| | K4 | 0 | b | b | a | a |

| | | SPEED | | | | |
|---|---|---|---|---|---|---|
| | | OFF | 1 | 2 | 3 | 4 |
| RELAYS | K1 | OFF | ON | OFF | ON | OFF |
| | K2 | OFF | OFF | ON | OFF | ON |
| | K3 | OFF | OFF | OFF | ON | ON |
| | K4 | -- | b | b | a | a |

| | | RELAYS | | | | |
|---|---|---|---|---|---|---|
| | | K1 | K2 | K3 | K4 | K5 |
| SPEED | OFF | OFF | OFF | 0 | 0 | OFF |
| | 1 | ON | OFF | OFF | OFF | OFF |
| | 2 | OFF | ON | OFF | OFF | OFF |
| | 3 | ON | OFF | ON | ON | OFF |
| | 4 | OFF | ON | ON | ON | OFF |
| | 5 | ON | OFF | OFF | ON | ON |

0 = ON OR OFF

MULTI-SPEED DUAL FAN MODULE SYSTEM FOR ENGINE COOLING APPLICATIONS

This application is based on U.S. Provisional Application No. 60/619,750, filed on Oct. 18, 2004, and claims the benefit thereof for priority purposes.

FIELD OF THE INVENTION

This invention relates to motors for automotive applications such as, but is not limited to, engine cooling, HVAC (Heating, Ventilation and Air Conditioning) applications.

BACKGROUND OF THE INVENTION

Figure 1:
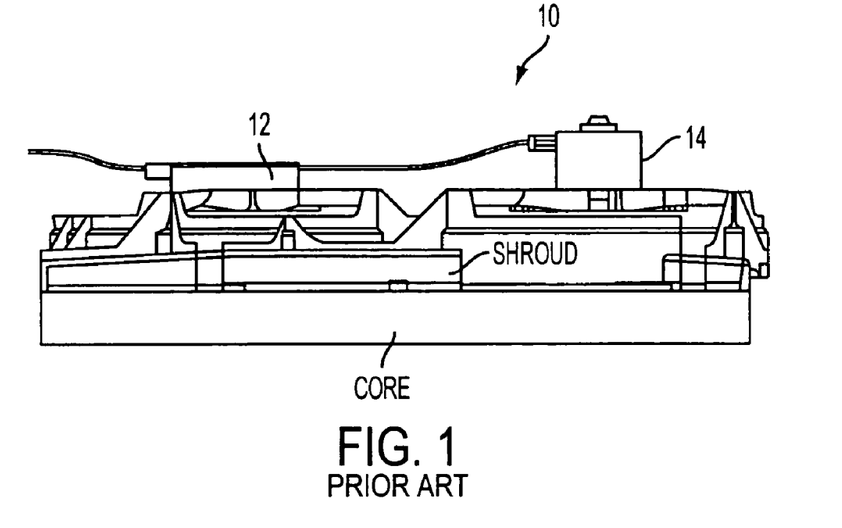
FIG. 1 is a plan view of a conventional two-speed dual fan module.
Figure 2:
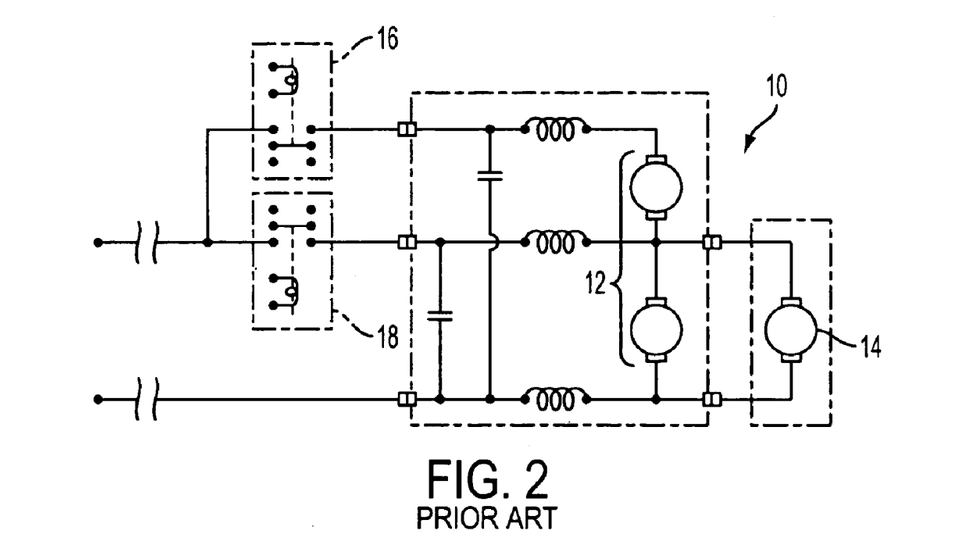
FIG. 2 is a circuit diagram for the module of FIG. 1.
Figure 3:
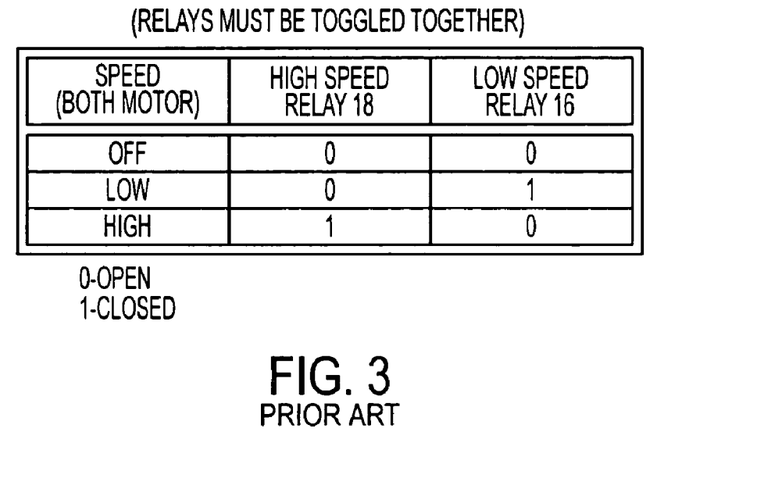
FIG. 3 is a truth table for controlling relays of the module of FIG. 2.

FIG. 1 shows a conventional, two-speed dual fan module, generally indicated at 10, for an engine cooling application. The module includes a two-speed motor 12 for operating a first fan, and a one-speed motor 14 for operating a second fan. The typical electrical schematic diagram is shown in FIG. 2, and the truth table for controlling relays 16, 18 and thus the speed of the motors 12, 14 is shown in FIG. 3. Motor 14 achieves two-speed operation by virtue of its connection to the two-speed motor 12. Any low or high-speed combination is possible with this module 10.

Figure 4:
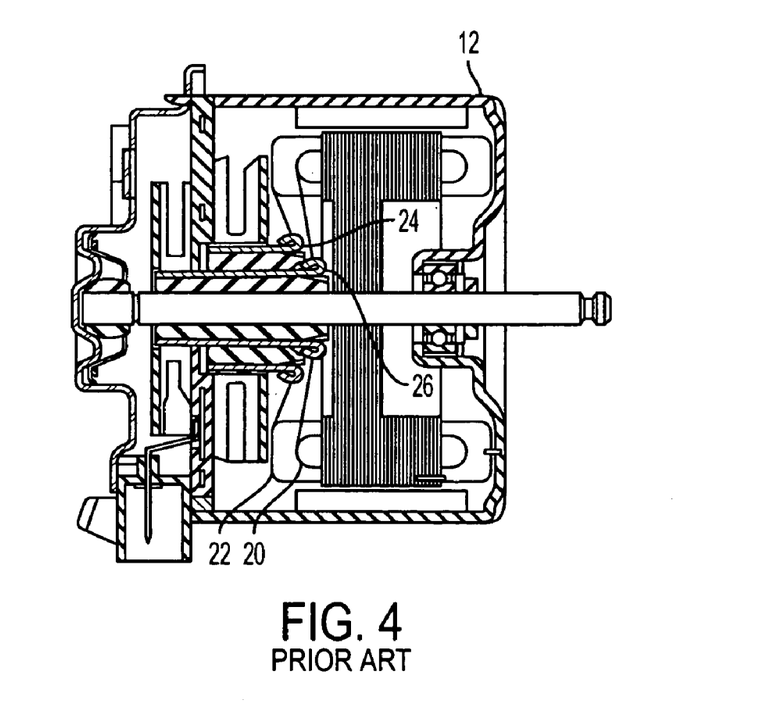
FIG. 4 is a sectional view of a conventional two-speed motor having a dual winding and dual commutator configuration.

FIG. 4 is a sectional view of the conventional two-speed motor 12 of the module 10 of FIG. 1. The motor 12 of FIG. 4 is of the type disclosed in U.S. Pat. Nos. 5,925,999 and 4,910,790, the contents of each of these patents are incorporated by reference into the present specification. This two-speed motor 12 has dual armature windings 20, 22 and dual commutators 24, 26. Any low or high speed combination is possible based on the selection of armature windings.

Figure 5:
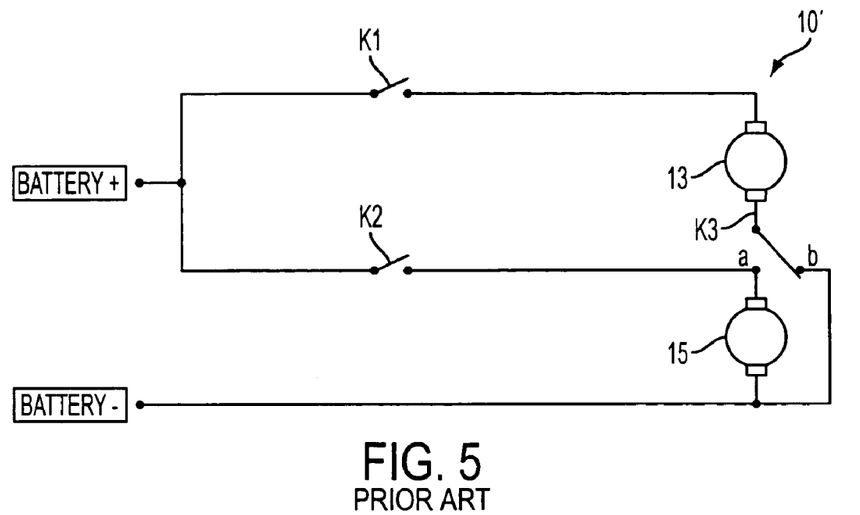
FIG. 5 is a circuit diagram of a conventional two-speed dual fan module series/parallel configuration.
Figure 6:
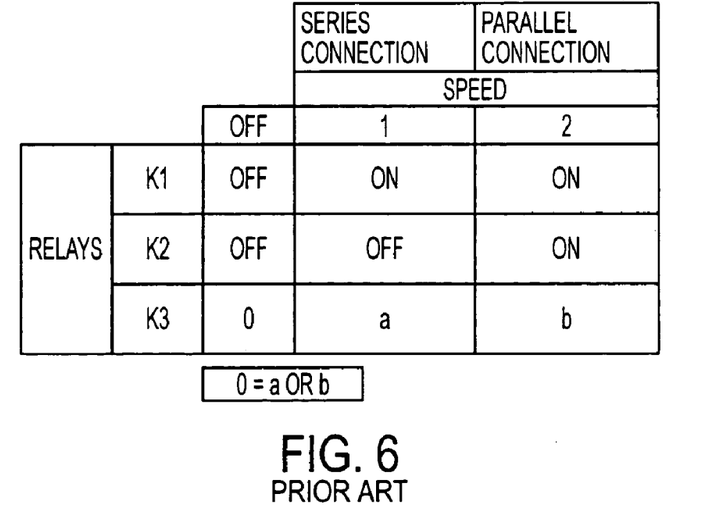
FIG. 6 is a truth table for controlling the relays of the circuit of FIG. 5.

FIG. 5 is an electrical schematic of a conventional two-speed dual fan module 10' in a series/parallel configuration having a pair of one-speed motors 13, 15. FIG. 6 shows the truth table for operating relays, K1, K2 and K3 to achieve two speeds for the module 10. Software preferably controls fan speed from OFF to LOW to HIGH speed (reverse order also occurs). LOW speed (SPEED 1) is achieved when both fans (e.g., motors 13, 15 of the module) are operated in series. HIGH speed (SPEED 2) is achieved when both fans (motors 13, 15) are operated in parallel.

Although the modules 10, 10' operate well for their intended purpose of providing a two-speed dual fan module, there is a need to provide a dual fan module, using existing motors, which can operate at more than two different speeds.

SUMMARY OF THE INVENTION

An object of the invention is to fulfill the need referred to above. In accordance with the principles of the present invention, this objective is achieved by providing a dual fan module system including a first electric motor operating a first fan, a second electric motor operating a second fan, and switching structure constructed and arranged to operate the system at more than two different speeds. The first and second motors can both be one-speed motors used together with a series resistor, or the first and second motors can both be two-speed motors, or the first motor can be a two-speed motor and the second motor can be a one-speed motor.

In accordance with another aspect of the invention, a method of operating a dual fan module system at more than two different speeds provides a two-speed electric motor for operating a first fan, a one-speed electric motor for operating a second fan, and switching structure associated with the motors. The switching structure is controlled to operate the system at more than two different speeds.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENT

Figure 7:
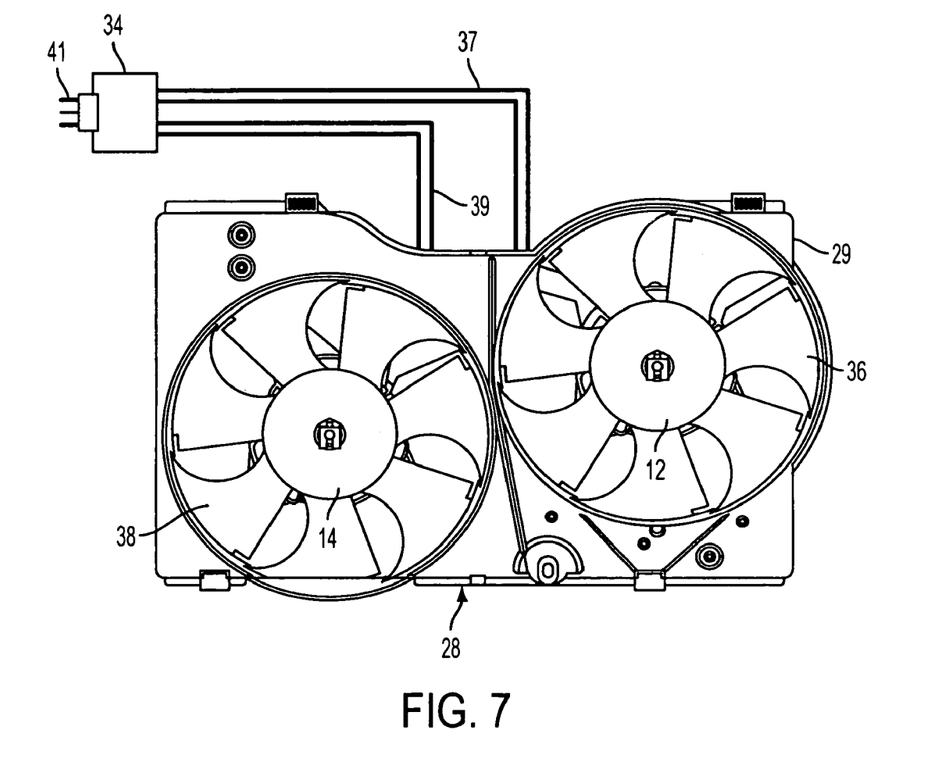
FIG. 7 is a front view of a four-speed dual fan module provided in accordance with the principles of the invention.
Figure 14:
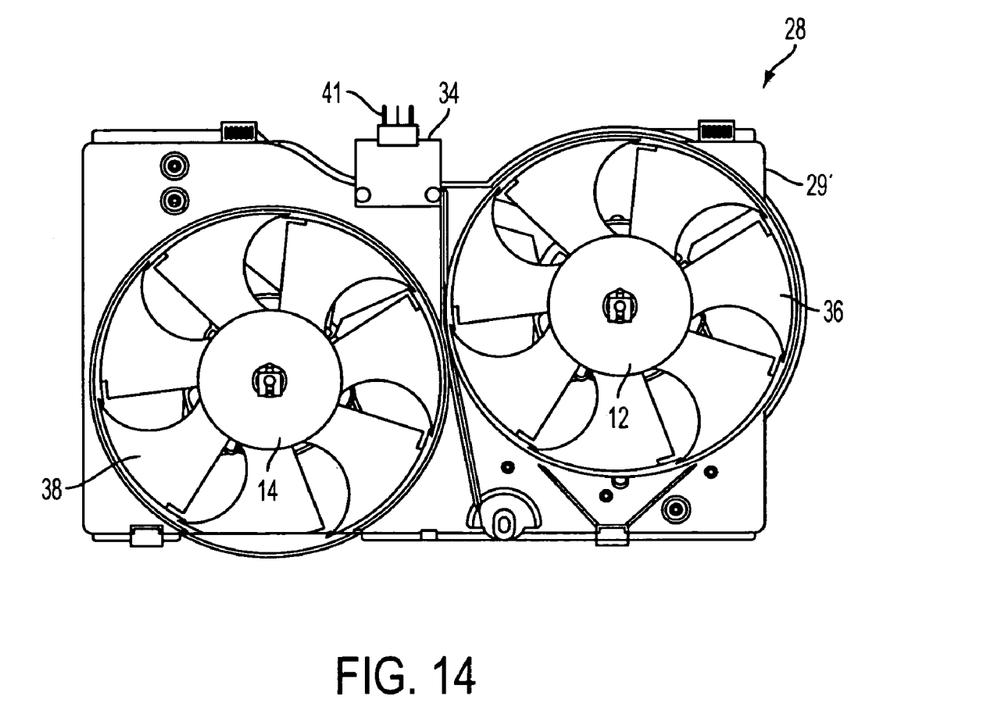
FIG. 14 is a front view of a dual module in accordance with the principles of the invention where the control box is part of the module.

With reference to FIG. 7, a multi-speed dual fan module system is shown, generally indicated at 28, in accordance with the principles of the present invention. The system 28 is preferably used in automotive applications such as engine cooling and Heating, Ventilation and Air Conditioning (HVAC) applications. The embodiment provides an innovative system and method of combining and configuring known technologies and devices such as a two-speed motor 12, a one-speed motor 14 in a dual fan module 29, and switching devices K1, K2, K3 and K4 (FIG. 8) preferably provided in a relay or control box 34. In the embodiment, the switching devices are electromagnetic relays and are typically part of the vehicle circuit, however, the control box 34 can be integrated into the dual fan module 29' as shown in FIG. 14. The switching devices can also be power Metal-Oxide-Semiconductor Field-Effect Transistors (MOSFETs).

As shown in FIG. 7, the two-speed motor 12, for operating a first fan 36 is preferably of the type disclosed in U.S. applications Ser. Nos. 10/976,615 and 10/976,616, the contents of which are hereby incorporated by reference into this specification. The one-speed motor 14, for operating a second fan 38, is conventional. The motor 12 is connected to the control box 34 via a power leads 37 and the motor 14 is connected to the control box 14 via power leads 39. Power and logic inputs 41 are provided to the control box 34.

Figure 8:
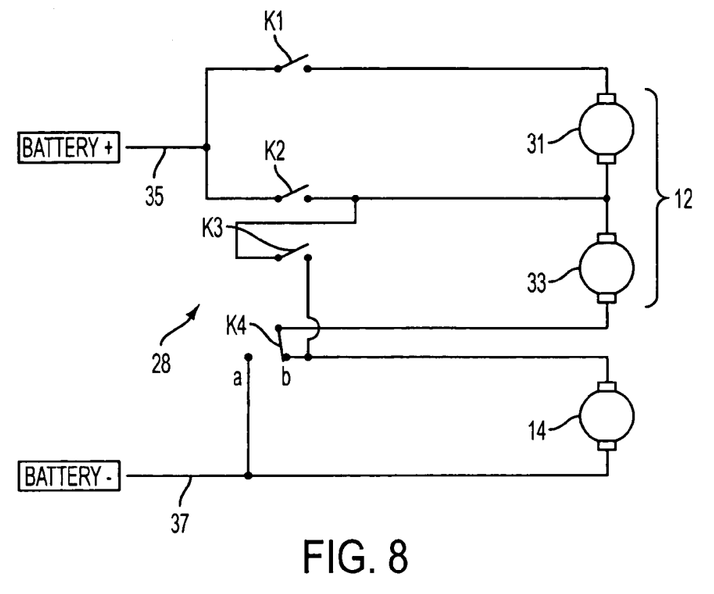
FIG. 8 is a circuit diagram of the module of FIG. 7.
Figure 9:
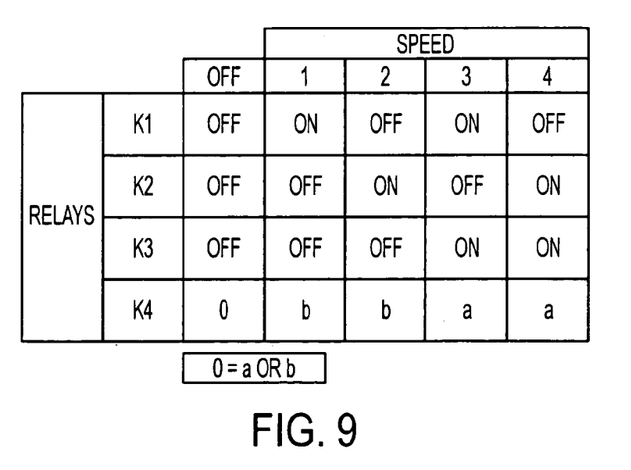
FIG. 9 is a truth table for controlling the relays of the circuit of FIGS. 8 and 10.

As shown in FIG. 8, the two-speed motor 12 includes a low speed winding 31 and a high speed winding 33. However, in accordance with the embodiment and in order to provide more than two speeds of operation of the system, a unique switching arrangement is shown in FIG. 8. Thus, switches, preferably relays K1, K2, K3 and K4 are provided and are controlled as shown in the table of FIG. 9 to achieve four different speeds of operation of the system 28.

With reference to FIG. 8, the first relay K1 is disposed between a positive lead 35 of a power source and an input to the positive side first winding 31. The second relay K2 is disposed between the positive lead 35 of the power source and an input to the positive side second winding 33. The third relay K3 is disposed between the positive lead 35 of the power source after the K2 relay and the positive power input to the one-speed motor 14 after K4. The fourth relay K4 is selectively associated with a first contact "a" and a second contact "b" such that when the fourth relay K4 engages the first contact "a", an output of the negative side of the second winding 33 is connected with a negative lead 37 of the power source, and when K4 engages the second contact "b", an output of the negative side of the second winding 33 is connected with an input to the one-speed motor 14. The output of the one-speed motor 14 is connected with the negative lead 37 of the power source.

Thus, to operate the system 28 at a first speed, K1 is ON or closed (energized so current flows), K2 is OFF or open (not energized), K3 is OFF, and K4 is at position (contact) "b" in FIG. 8. To operate the system at a second speed, K1 is OFF, K2 is ON, K3 is OFF and K4 is at position "b". The third speed occurs when K1 is on, K2 is OFF, K3 is ON, and K4 is at position "a". Finally, the fourth speed occurs when K1 is OFF, K2 is ON, K3 is ON and K4 is at position "a".

Figure 10:
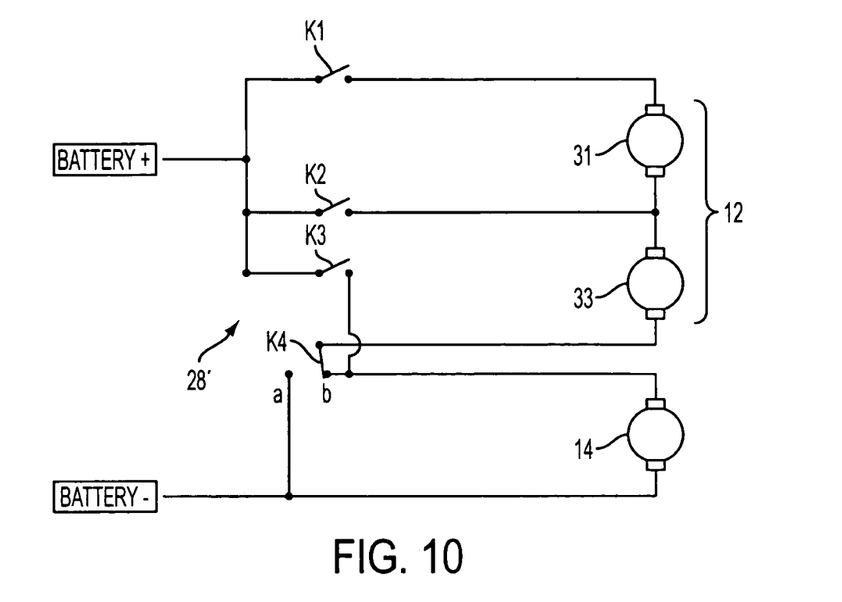
FIG. 10 is an alternative circuit diagram for the module of FIG. 7.

FIG. 10 shows an alternative circuit diagram for a dual fan module system 28' that operates at four different speeds. The table of FIG. 9 also applies to the circuit of FIG. 10.

Thus, the systems 28, 28' provide at least a three (preferably four) speed dual fan module system by using a conventional two-speed and a conventional one-speed motor. Only one additional relay and lead wire is provided at the vehicle side for four-speed operation as compared to the conventional two-speed, series/parallel configuration. The systems 28, 28' are of lower cost than a Pulse. Width Modulated system, use conventional brush motor technology with conventional relays, and have electrical power levels up to 600 W. The systems 28, 28' are more efficient and more reliable than a resistor solution for low speed operation. In addition, body connectors can be used on both motors 30, 32 since no external devices such as resistor(s) are needed for the multi-speed systems 28, 28'.

Figure 11:
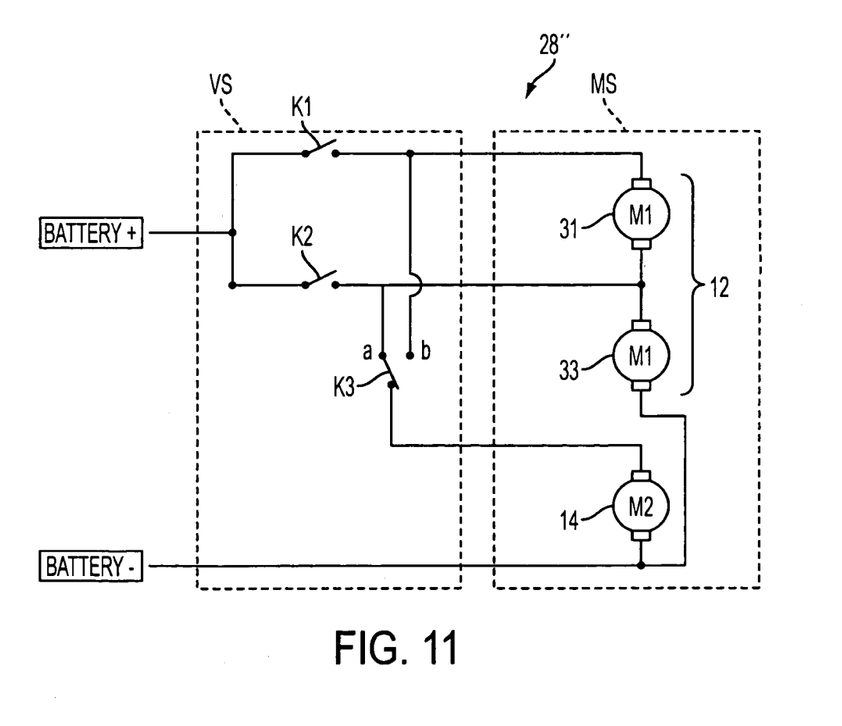
FIG. 11 is a circuit diagram of a dual module provided accordance with the principles of the invention for three speed operation.
Figure 13:
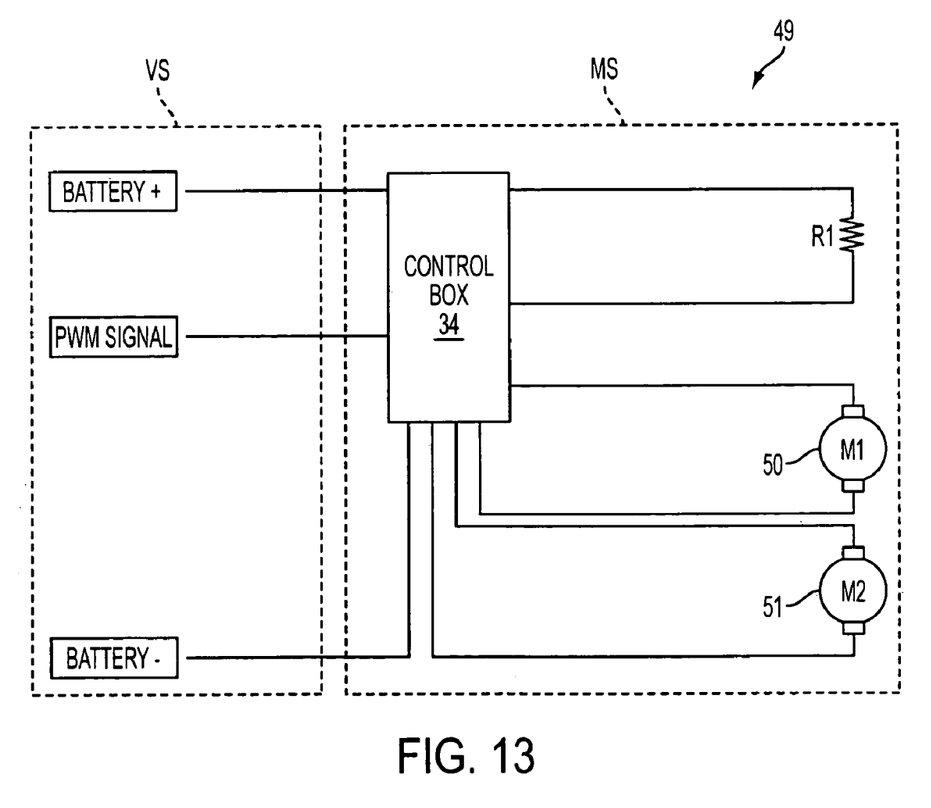
FIG. 13 is a circuit diagram of a dual module provided accordance with the principles of the invention for three-speed operation using two one-speed motors and a series resistor.

FIG. 11 illustrates an electrical circuit of a dual module, generally indicated at 28", in accordance with the principles of the invention for three-speed operation. The motor 12 is a two-speed motor and motor 14 is a single speed motor. If the low speed winding 31 of motor 12 is replaced by a current limiting device such as a series resistor, then both motors can be one speed motors. Thus, three different operating speeds can be achieved with the dual fan module having two one-speed motors. This module 49 is shown in FIG. 13 where two single speed motors, 50, 51 are used in combination of at least one series resistor R1 and the switches K1, K2 and K3 are integrated into the control box 34. The control box 34 in this embodiment is part of the module assembly; however it can be an external component. Furthermore, the operating speed requirements are determined by the control box 34 based on an input PWM signal. Then, the corresponding switches are turned on to allow current flow to the corresponding components, (motor 50, motor 51 and series resistor(s) R1 or low and high speed windings 31, 33 of motor 12 (FIG. 11).

Figure 12:
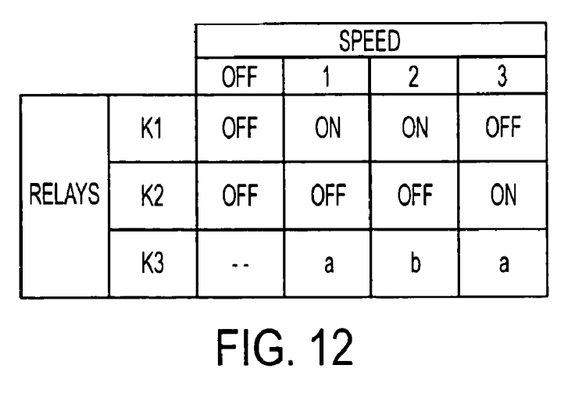
FIG. 12 is a truth table of controlling the switches of the circuit on FIG. 11.

FIG. 12 is a truth table of controlling the switches of the circuit on FIG. 11. In order to accomplish speed 1, the electrical current needs to flow through K1 and energize the low speed winding 31 in motor 12. Furthermore, since the K2 switch is off (current does not flow there-through) and the switch K3 is at "a" position, the current flow branches out in two parallel paths. In one path, the current continues to flow through the high-speed armature winding 33 of the motor 12 and then to ground. The other current path is through motor 14 then to ground.

Speed 2 is achieved by allowing current flow through switch K1 and K3 at the "b" position. Since there is no current flowing through switch K2, the electrical circuit is split into two parallel paths. This essentially means that motor 12 and motor 14 are in parallel circuits; however, the low speed winding 31 and the high speed winding 33 are connected in series. In case, when the low speed winding 31 is replaced by at least one series resistor R1 (as shown on FIG. 13), then the series resistor R1 is electrically connected in series with motor 12 and the motor 14 is in parallel connection with the motor 12 and series resistor R1.

Speed 3 is achieved by the switching arrangement where only the high speed winding 33 in motor 12 is energized in parallel connection with motor 14. Therefore, the electrical current flows through switch K2 (not K1) and through K3 at "a" position. When the low speed winding 31 is replaced by at least one series resistor R1 (as shown on FIG. 13), then the series resistor R1 is bypassed. Therefore, the two single speed motors (motor 50 and motor 51) are in a parallel electrical circuit.

The dual module 28" is off or not energized when both switches K1 and K2 are off and not conducting electrical current.

FIG. 14 illustrates a dual module 54 in accordance with the principles of the invention where the control box is part of the module assembly and referenced to FIG. 13.

Figure 15:
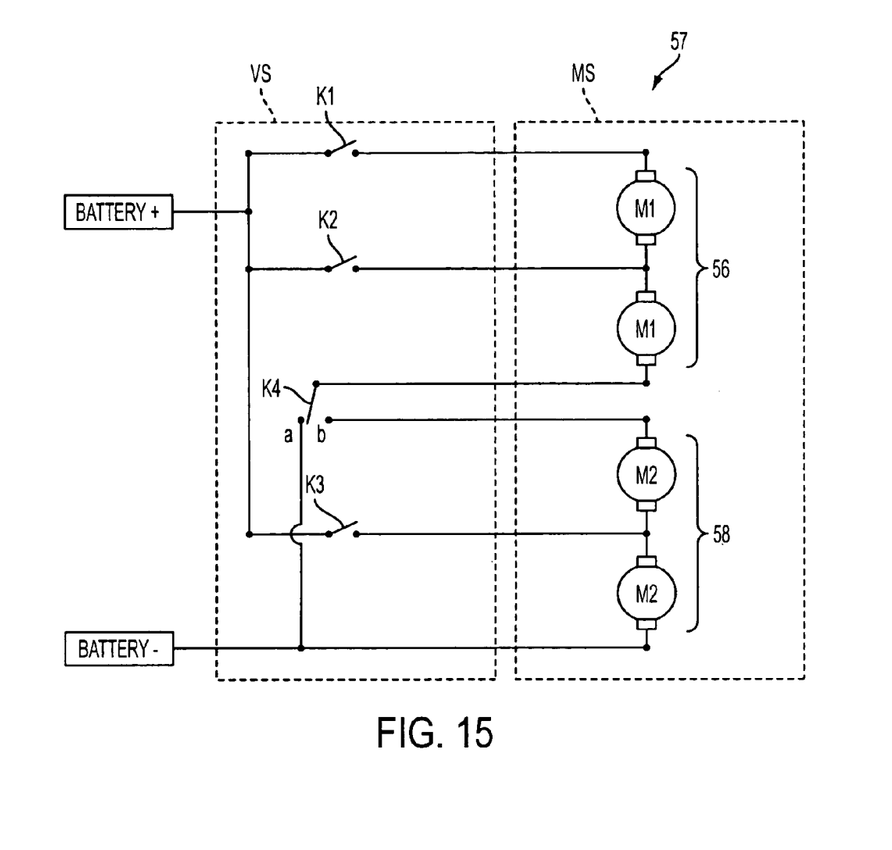
FIG. 15 is a circuit diagram of a dual module provided in accordance with the principles of the invention for four-speed application with two, two-speed motors.
Figure 16:
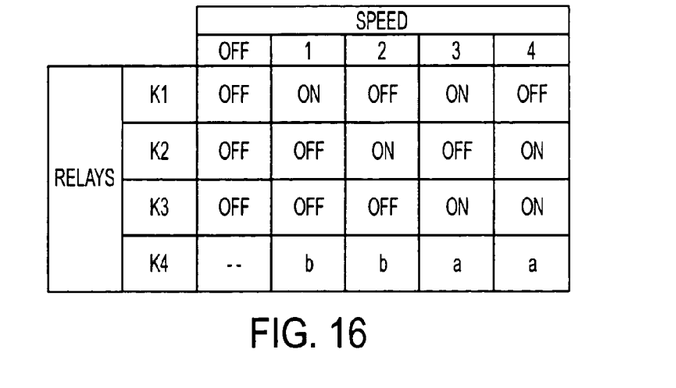
FIG. 16 is a truth table of controlling the switches of the circuit on FIG. 15.

FIG. 15 illustrates an electrical circuit of a dual module 57 in accordance with the principles of the invention for four-speed application with two, two-speed motors 56, 58. FIG. 16 tabulates the switching arrangements of the power switches K1, K2, K3 and K4 in order to achieve four discrete operating load points for the dual module 57.

An operating load point is defined by the airflow (flow rate at m³/sec) produced by the rotating fans (motor 56 is rotating a first fan and the motor 58 rotates a second fan at certain speeds (speed 1, 2, 3, 4 . . . ) and by generating certain air pressure conditions (measured in Pa). The product of air pressure and corresponding flow rate (airflow) defines the air power generated by the dual module 57 at specific operating speeds of the first and second fans. In some cases, the operating speed of one fan (motor) of the two fans at one operating load point might be approximately the same as in another operating load point; however the overall total air power produced by the two fans (motors) is different. Therefore, in the dual fan module configuration, the discrete operating points are defined by the air power produced by the two rotating fans (motor 56 and motor 58 rotating the fans). The discrete rotational speeds of the first fan (motor 56) and the second fan (motor 58) are achieved by the switching arrangements outlined in the truth tables of FIG. 9, FIG. 12, FIG. 16 and FIG. 18.

Figure 17:
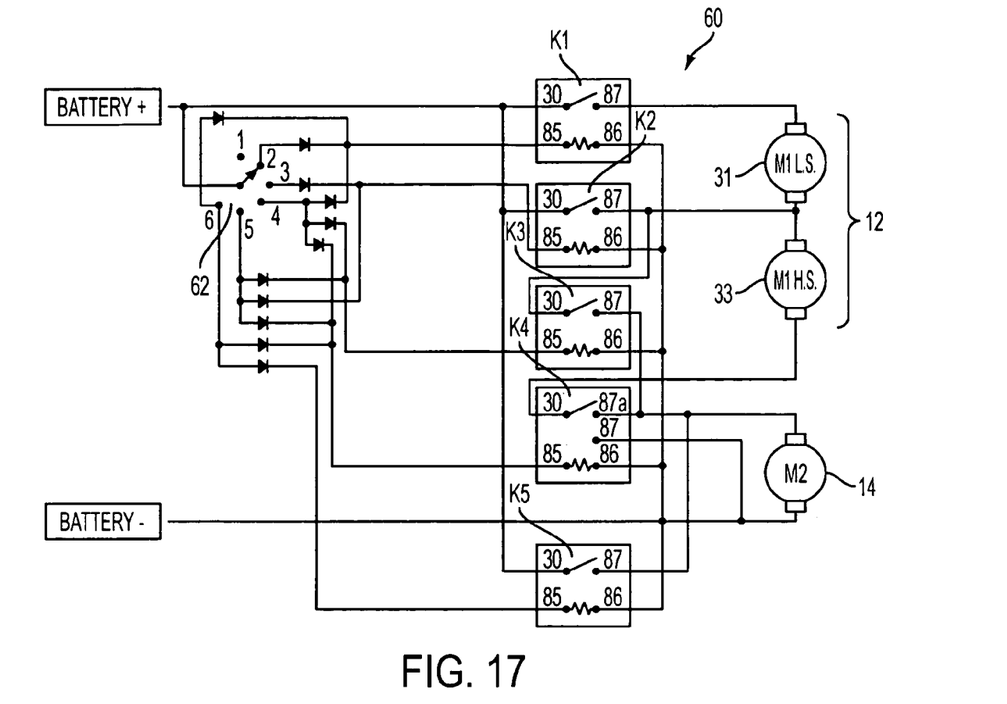
FIG. 17 is a circuit diagram of a dual module in accordance with the principles of the invention for five-speed application with one two-speed motor and a single-speed motor.
Figure 18:
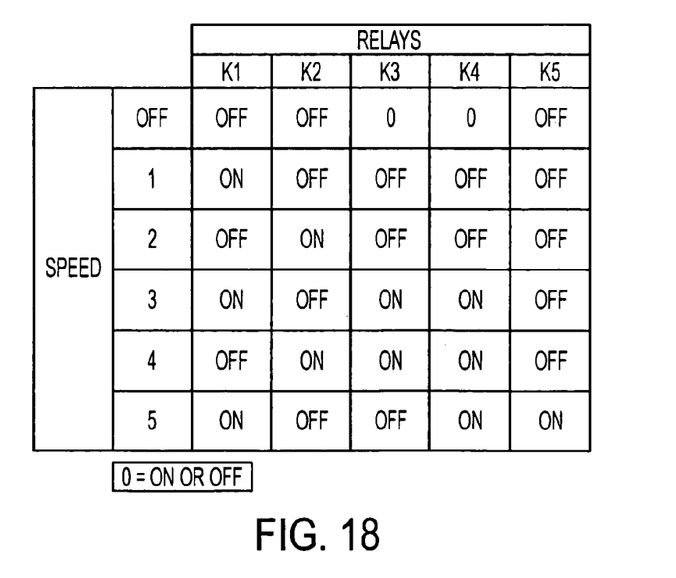
FIG. 18 is a truth table of controlling the switches of the circuit on FIG. 17.

FIG. 17 shows an electrical circuit of a dual module 60 in accordance with the principles of the invention for five-speed application with one two-speed motor 12 and a single-speed motor 14. FIG. 18 tabulates the switching arrangements of the power switches K1, K2, K3, K4 and K5 in order to achieve five discrete operating points for the dual fan module 60. The electrical circuit illustrated in FIG. 17 is basically the combination of the electrical circuits shown in FIG. 8 and FIG. 10. When the main switch 62 (this can be a mechanical turn switch or electronic device that is controlled by a logic circuit/program) in FIG. 17 is at position 1 the whole dual module (motor/fan 12 and motor/fan 14) is off or not energized. The other positions 2, 3, 4, 5, and 6 of the main switch 62 correspond to the respective speed settings shown on FIG. 18; (main switch position 2 to speed 1, 3 to 2 . . . 6 to 5). The low speed winding 31 of motor 12 also can be replaced by a series resistor R1 as shown in FIG. 13 and as described above with reference to FIG. 11. Furthermore, the packaging of the power switches can be (but is not limited to, the packaging as shown in FIG. 7 or FIG. 14) integrated into the motor module or external part of the motor-fan-module or part of the vehicle electrical circuit and the logic of energizing the switches also can be programmed into the vehicle's computer or part of the motor-fan-module assembly. Also, the power switches K1-K5 can be, but are not limited to, electromagnetic relays or MOSFETs.

Figure 19:
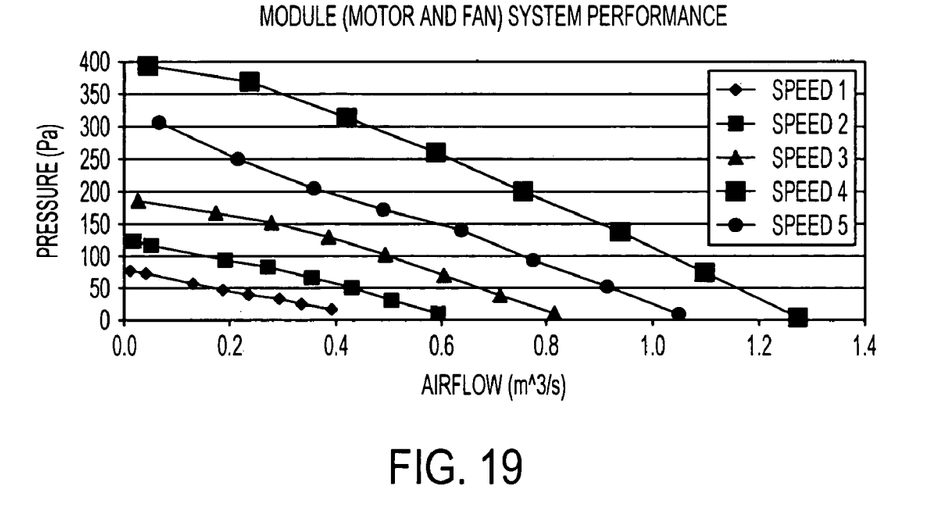
FIG. 19 is a graph of air pressure vs. airflow produced by the dual fan module of FIG. 17.

FIG. 19 shows a typical graph of air pressure (measured in Pascal, Pa) vs. airflow (flow rate measured in m³/sec.) produced by the dual fan module system shown on FIG. 17 if the unit is operated at five speeds as tabulated in FIG. 18. As the graph shows, there are five discrete operating curves achieved. The separation between each line can be controlled by the armature windings of each motor, including the low speed and high speed winding of the motor 12 or the resistance value of the series resistor R1 shown in FIG. 13 and by the amount of magnetic flux present in each motor. Furthermore, the overall efficiency of the fan module system depends on the type of fans used and the shroud configuration. The fan blade profile determines the loading on the motor when the motor is energized. The fan load on the motor is typically defined by the following ratio: $speed/(torque)^{0.5}$. (There are additional loads on the system depending on the overall resistance of the system, heat exchanger, front of the vehicle, airflow blockage by the engine block or other vehicle components). The fans can be, but not limited to, the type described in U.S. Pat. No. 6,428,277 or U.S. Pat. No. 6,368,061.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A dual fan module system comprising:
a first electric motor operating a first fan,
a second electric motor operating a second fan, and switching structure constructed and arranged to operate the system at more than two different speeds,
wherein the first motor is a two-speed motor having first and second commutators and associated first and second windings, and wherein the second motor is a one-speed motor, and
wherein the switching structure includes at least a first switching device, a second switching device, a third switching device, and a fourth switching device, the first switching device is disposed between a positive lead of a power source and an input to the positive side first winding, the second switching device is disposed between the positive lead of the power source and an input to the positive side second winding, the third switching device is disposed between the positive lead of the power source after the second switching device and the positive power input to the one-speed motor after the fourth switching device, the fourth switching device is selectively associated with first and second contacts, such that when the fourth switching device engages the first contact, an output of the negative side of the second winding is connected with a negative lead of the power source, and when the fourth switching device engages the second contact, an output of the negative side of the second winding is connected to an input to the one-speed motor, and wherein an output of the one-speed motor is connected with the negative lead of the power source.

2. The system of claim 1, wherein the first and second windings are arranged in series.

3. The system of claim 1, wherein the switching devices are constructed and arranged to operate the system at 1) a first speed, wherein the first switching device is on, the second switching device is off, the third switching device is off and the four switching device engages the second contact, 2) a second speed, wherein the first switching device is off, the second switching device is on, the third switching device is off and the four switching device engages the second contact, and 3) a third speed, wherein the first switching device is on, the second switching device is off, the third switching device is on and the four switching device engages the first contact.

4. The system of claim 3, wherein the switching devices are constructed and arranged to operate the system at a fourth speed, wherein the first switching device is off, the second switching device is on, the third switching device is on and the four switching device engages the first contact.

5. The system of claim 1, wherein the switching structure includes electromagnetic relays.

6. The system of claim 1, wherein the switching structure includes power MOSFETs.

7. The system of claim 1, wherein the switching structure is provided in a structure coupled directly with the dual fan module.

8. A dual fan module system comprising:
a first electric motor operating a first fan,
a second electric motor operating a second fan, and means for operating the system at more than two different speeds, wherein the first motor is a two-speed motor having first and second commutators and associated first and second windings, and wherein the second motor is a one speed motor, and wherein the means for operating includes at least a first switching device, a second switching device, a third switching device, and a fourth switching device, the first switching device is disposed between a positive lead of a power source and an input to the positive side first winding, the second switching device is disposed between the positive lead of the power source and an input to the positive side second winding, the third switching device is disposed between the positive lead of the power source after the second switching device and the positive power input to the one-speed motor after the fourth switching device, the fourth switching device is selectively associated with first and second contacts, such that when the fourth switching device engages the first contact, an output of the negative side of the second winding is connected with a negative lead of the power source, and when the fourth switching device engages the second contact, an output of the negative side of the second winding is connected to an input to the one-speed motor, and wherein an output of the one-speed motor is connected with the negative lead of the power source.

9. The system of claim 8, wherein the first and second windings are arranged in series.

10. The system of claim 8, wherein the switching devices are constructed and arranged such that to operate the system at 1) a first speed, the first switching device is on, the second switching device is off, the third switching device is off and the four switching device engages the second contact, 2) a second speed, the first switching device is off, the second switching device is on, the third switching device is off and the four switching device engages the second contact, 3) a third speed, the first switching device is on, the second switching device is off, the third switching device is on and the four switching device engages the first contact, and 4) a fourth speed, the first switching device is off, the second switching device is on, the third switching device is on and the four switching device engages the first contact.

11. The system of claim 8, wherein the means for operating includes electromagnetic relays.

12. The system of claim 8, wherein the means for operating includes power MOSFETs.

13. The system of claim 8, wherein the switching structure is provided in a structure coupled directly with the dual fan module.

14. A method of operating a dual fan module system at more than two different speeds, the method including:

providing a two-speed electric motor operating a first fan, providing a one-speed electric motor operating a second fan, providing switching structure associated with the motors, and controlling the switching structure to operate the system at more than two different speeds, wherein the step of providing the two-speed motor includes providing the two-speed having first and second commutators and associated first and second windings, the windings being arranged in series, and wherein the step of providing switching structure includes providing at least a first switching device, a second switching device, a third switching device, and a fourth switching device, the first switching device is disposed between a positive lead of a power source and an input to the positive side first winding, the second switching device is disposed between the positive lead of the power source and an input to the positive side second winding, the third switching device is disposed between the positive lead of the power source after the second switching device and the positive power input to the one-speed motor after the fourth switching device, the fourth switching device is selectively associated with first and second contacts, such that when the fourth switching device engages the first contact, an output of the negative side of the second winding is connected with a negative lead of the power source, and when the fourth switching device engages the second contact, an output of the negative side of the second winding is connected to an input to the one-speed motor, and wherein an output of the one-speed motor is connected with the negative lead of the power source.

15. The method of claim 14, wherein step of controlling includes ensuring that 1) for a first speed, the first switching device is on, the second switching device is off, the third switching device is off and the four switching device engages the second contact, 2) for a second speed, the first switching device is off, the second switching device is on, the third switching device is off and the four switching device engages the second contact, 3) for a third speed, the first switching device is on, the second switching device is off, the third switching device is on and the four switching device engages the first contact, and 4) for a fourth speed, the first switching device is off, the second switching device is on, the third switching device is on and the four switching device engages the first contact.

16. The system of claim 14, wherein the step of providing switching structure includes providing at least four electromagnetic relays.

17. The system of claim 14, wherein the step of providing switching structure includes providing at least four power MOSFETs.

* * * * *